J. C. ZIMMERMAN.
Corn Sheller.
No. 78,714.
Patented June 9, 1868.
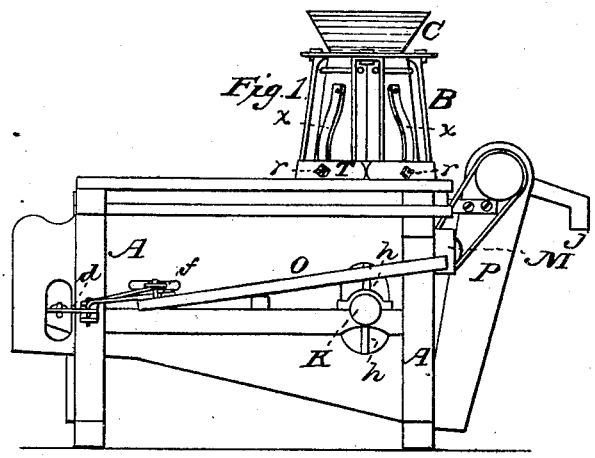
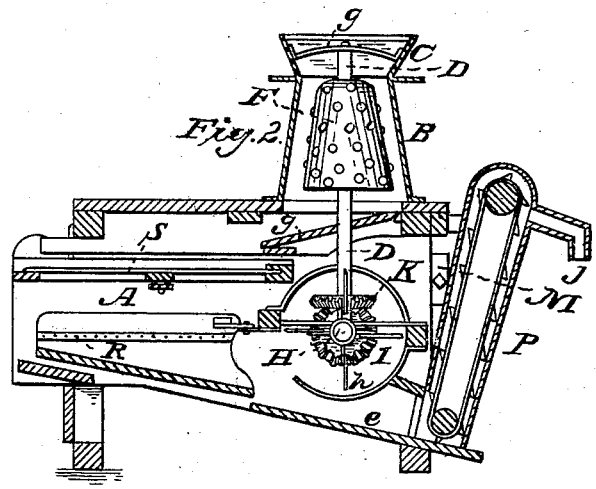
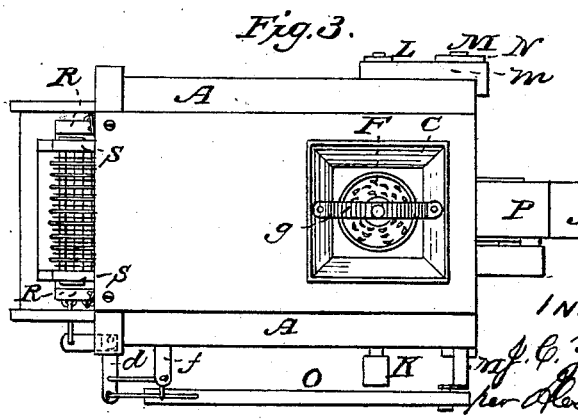

United States Patent Office.

J. C. ZIMMERMAN, OF EBERLY'S MILL, PENNSYLVANIA.

*Letters Patent No. 78,714, dated June 9, 1868.*

---

IMPROVEMENT IN CORN-SHELLER.

---

*The Schedule referred to in these Letters Patent and making part of the same.*

---

TO ALL WHOM IT MAY CONCERN:

Be it known that I, J. C. ZIMMERMAN, of Eberly's Mill, in the county of Cumberland, and in the State of Pennsylvania, have invented certain new and useful Improvements in Corn-Shellers; and do hereby declare that the following is a full, clear, and exact description thereof, reference being had to the accompanying drawings, and the letters of reference marked thereon.

In the annexed drawings, making a part of this specification—

Figure 1 represents a side elevation, and

Figure 2 represents a section of my corn-sheller.

Figure 3 represents a top view of said corn-sheller.

A represents a suitable frame and boxing, to support and enclose the parts of my machine, and B represents the casing or outside of the shelling part of the machine, to be more fully described.

The casing, B, is made of any suitable material, and may be provided with ribs or projections on the inside thereof, to assist in shelling or detaching the corn from the cob. The casing B is secured in a vertical position to the top of the frame and box A.

On top of the casing B is secured the hopper C, into which the ears of corn are poured to be shelled. Across the hopper C is a horizontal bar or rod, $g$, which forms a bearing for the upper end of the shaft D.

The shaft D is adjusted vertically, and has its lower or bottom bearing in a horizontal beam just over the shaft H.

Secured to the shaft D, near its lower end, is a bevelled gear-wheel, E, which meshes with and is operated by the gear I on the shaft H. The sheller F, provided with projections, as shown, is secured to the shaft D, and works or revolves inside of the casing B, and by means of its projections and the confinement of the ears of corn between its sides and the sides of the casing, detaches the corn completely from the cob.

The casing B is made in sections, each section provided with flanges, and the upper ends of the flanges bolted together, as shown. The lower ends of the sections are confined within certain limits by means of the irregular band T, and the sides or sections held in proper position by means of the springs $x\ x$. By means of said springs $x\ x$, the sides of the casing B will expand or give way so as to correspond with the size of the corn to be shelled. The springs may also be tightened by means of set-screws $r\ r$, should the springs be too weak to hold the sides or sections close enough to the sheller F.

H represents a shaft adjusted horizontally across the frame A, having secured to one end of it the pulley K, to which power is applied to drive this machine, and also having the gear-wheel I secured to its centre, and another pulley, L, at the other end, as is fully shown.

The shaft H has also secured to it, on each side of the gear-wheel I, fans $h\ h$, surrounded by suitable casing, for the purpose of fanning or cleaning the corn when shelled.

Under the sheller F, and around the shaft, is adjusted an inclined spout or slide $q$, so that the corn and cobs will flow or slide forward and down on to a sifter, S, the corn passing through the meshes of it and the sieve R down to the inclined board or spout $c$, from the lower end of which it is taken up in a suitable elevator, P, and conducted into a bag or vessel through the spout $j$.

M represents a horizontal shaft, adjusted across the frame A, parallel with and a little higher than the shaft H, and has a pulley, N, on one end of it, by which it is operated by means of a band from the pulley L.

The shaft M has also another pulley secured near its centre, by which the elevator P is operated.

A crank is also secured on one end of the shaft M, by which the pitman O is operated.

Suspended in front of the shaft D, and between the sides of the frame A, are two sieves or sifters S and R.

The sifter S is made with a suitable frame and wire stretched across one way, at the required distance apart, to hold all cobs and straw, and is operated or worked backward and forward longitudinally with the frame by means of the lever $f$, which is pivoted in the side of the frame A, in the centre, and to said sifter at one end, and to the pitman O or the elbow-lever $d$ at the other.

R represents an ordinary sieve, suspended as above described, and operated by means of the elbow-lever $d$ and pitman O.

The sieve R works backward and forward laterally, while the one above it, represented by S, is operated or vibrated longitudinally by means of the same pitman O.

It will readily be seen that the sheller F, with its shaft D, is operated by means of the gear-wheels E and I, the gear-wheel I being secured to the shaft H, and therefore that the fans $h\ h$ and sheller F are operated by means of the power applied to the shaft H.

Having thus fully described my invention, what I claim as new, and desire to secure by Letters Patent, is—

The combination of the casing B, its springs $x\ x$ and sheller F, with the sieves S R, fans $h\ h$, conveyer P, operated the shafts D H and their cogs, the whole constructed as and for the purposes specified.

In testimony that I claim the foregoing, I have hereunto set my hand, this 1st day of April, 1868.

J. C. ZIMMERMAN.

Witnesses:
A. N. MARR,
A. A. YEATMAN.